United States Patent [19]
You

[11] Patent Number: 5,833,109
[45] Date of Patent: Nov. 10, 1998

[54] PINCH ROLLER DRIVING DEVICE FOR VIDEO RECORDING AND REPRODUCING SYSTEM

[75] Inventor: Lee Hyun You, Pyungtaek, Rep. of Korea

[73] Assignee: LG Electronics, Inc., Seoul, Rep. of Korea

[21] Appl. No.: 803,928

[22] Filed: Feb. 21, 1997

[30] Foreign Application Priority Data

Feb. 22, 1996 [KR] Rep. of Korea ..................... 1996-4163

[51] Int. Cl.⁶ ............................ B65H 20/00; G03B 19/04
[52] U.S. Cl. ........................... 226/187; 226/194; 242/354
[58] Field of Search ................................. 226/181, 183, 226/187, 194, 174, 176; 242/354, 354.2; 360/96.4

[56] References Cited

U.S. PATENT DOCUMENTS

| | | |
|---|---|---|
| 3,662,938 | 5/1972 | Hagiwara ............................ 226/176 X |
| 4,674,001 | 6/1987 | Takahashi et al. ................. 360/96.4 X |
| 4,694,983 | 9/1987 | Suzuki ..................................... 226/181 |
| 4,809,101 | 2/1989 | Tanaka et al. .......................... 360/96.4 |
| 5,214,551 | 5/1993 | Kaneda ............... 360/96.4 X |
| 5,307,972 | 5/1994 | Chang ................. 226/181 X |
| 5,524,806 | 6/1996 | Asakura et al. ..................... 242/354 X |

Primary Examiner—Michael Mansen

[57] ABSTRACT

A pinch roller driving device including a vertical moving member which has a holder for moving a pinch roller upward and downward, and an arm formed integrally with the holder for attaching the pinch roller. The pinch roller driving device is composed of the vertical moving member having such an improved structure including: a rotating member for moving the vertical moving member upward and downward, and a horizontal moving member for moving the vertical moving member toward a capstan shaft. According to this invention, it is possible to precisely maintain the squareness that has an effect on the stable transfer of the video tape, and to avoid the tape damage and noise occurrence during video recording and reproducing.

22 Claims, 6 Drawing Sheets

PINCH ROLLER DRIVING DEVICE FOR VIDEO RECORDING AND REPRODUCING SYSTEM

BACKGROUND OF THE INVENTION

1. Field of the Invention

The present invention relates to a pinch roller driving device for video recording and reproducing system, and more particularly to a pinch roller driving device having an improved structure to maintain precise actuation thereof, and to improve the assembly efficiency by reducing the number of component parts.

2. Description of the Prior Art

Conventional video recording and reproducing systems are provided with a pinch roller driving device for bringing a pinch roller into tight contact with a capstan shaft, where a video tape is transferred based on the direct rotating force of the capstan shaft and the auxiliary rotating force of the pinch roller.

Figure 1:
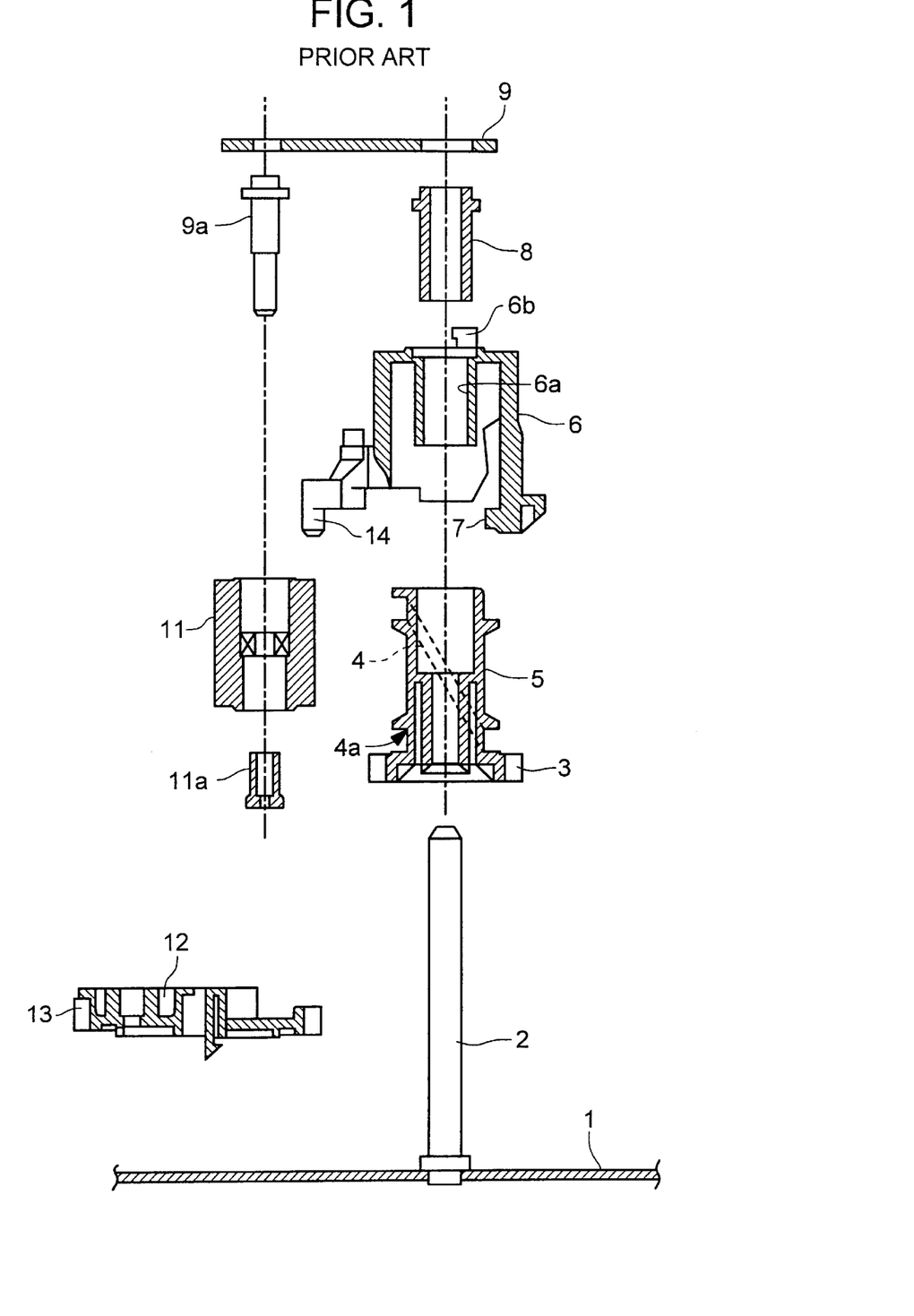
FIG. 1 is an exploded longitudinal sectional view showing a conventional pinch roller driving device.
Figure 2A:
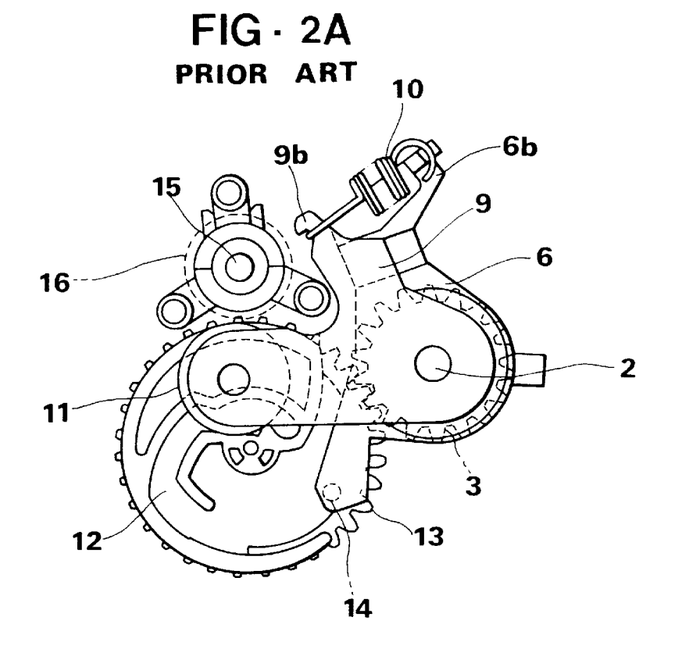
FIG. 2A is a schematic top plan view showing the state before the pinch roller is contacted to the capstan shaft in the conventional driving device.
Figure 2B:
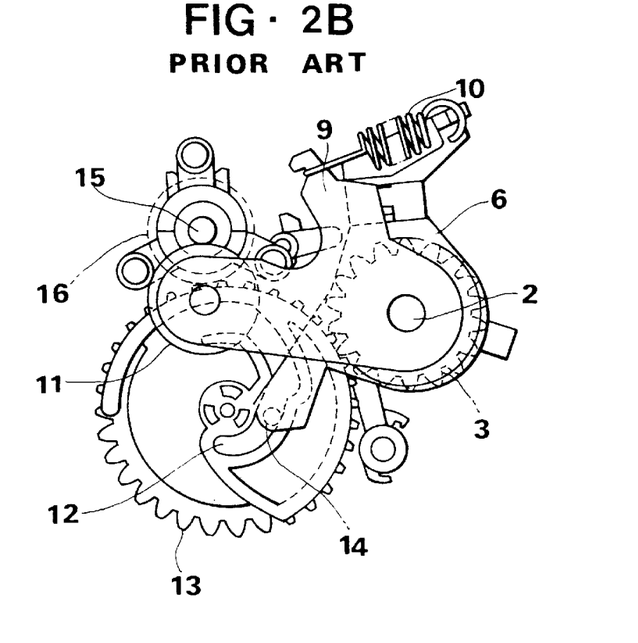
FIG. 2B is a schematic top plan view showing the state after the pinch roller is contacted to the capstan shaft in the conventional driving device.
Figure 3A:
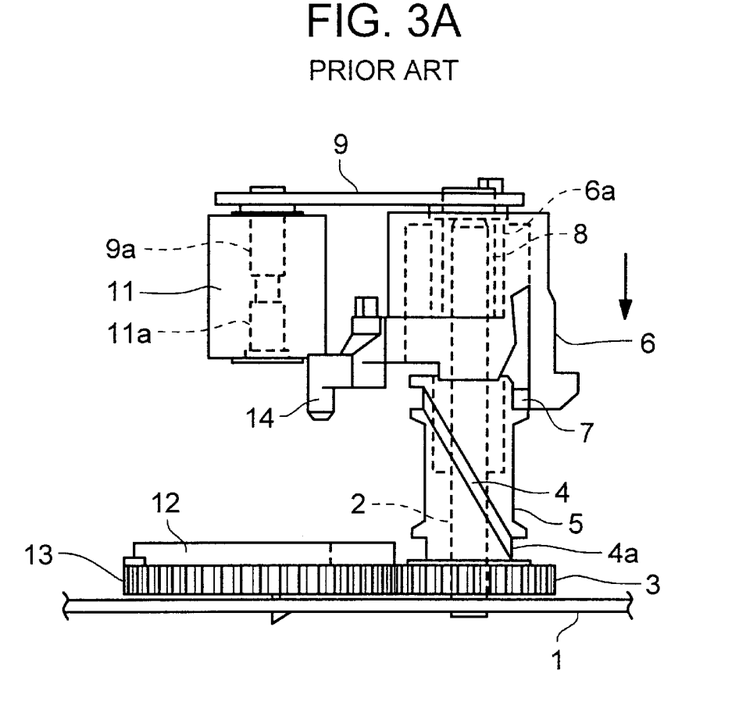
FIG. 3A is a schematic front view showing the state when holder is moved upward in the conventional driving device.
Figure 3B:
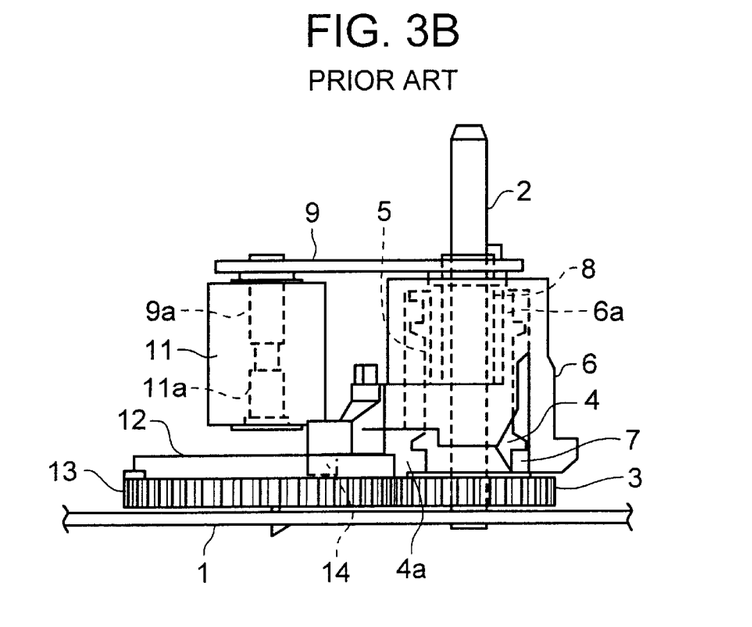
FIG. 3B is a schematic front view showing the state when the holder is moved downward in the conventional driving device.

FIG. 1 through FIG. 3 of the drawings illustrate a conventional pinch roller driving device. In the conventional pinch roller driving device, a shaft 2 is fixed on a deck base 1, and a rotating member 5 including a driving gear 3 is inserted to the shaft 2, where the driving gear is formed integrally with the lower end of the rotating member 5. The driving gear 3 is rotated by the driving force of a motor (not shown). On the outer surface of the rotating member 5, an oblique guide groove 4 and a horizontal guide groove 4a are engraved continuously in order to guide a holder 6. The holder 6 is inserted in rotating member 5 from above in manner that enables the rotating member 5 to rotate and move vertically. The holder 6 has first protrusion 7, which is projected radially inwardly for insertion into said oblique guide groove 4 to cause vertical movement of the holder 6 according to the rotating direction of the rotating member 5. Over the holder 6, an arm 9 is disposed through a bushing 8. The arm 9 is provided with a bushing 8 inserted on one end and a pinch roller shaft 9a inserted on the other end. The bushing 8 is slidably inserted to a cylindrical portion 6a of holder 6.

As shown in FIG. 2A, a cylindrical coil spring 10 is interposed between holder 6 and arm 9. A pinch shaft 9a is inserted rotatably into pinch roller 11. A cap 11a is inserted to the front end of shaft 9a, to prevent separation of pinch roller 11. On the deck base 1, is provided, the cam gear 13 being a cam gear 13 driven by the driving force of the driving gear 3. The holder 6 has second protrusion 14, which is projected downwardly from the lower end of the holder 6 and inserted into a cam groove 12 formed on said cam gear 13. When the holder 6 is moved downward, as shown in FIG. 3B, the second protrusion 14 of, holder 6 is guided by cam groove 12, causing holder 6 to be rotated in a forward forwardly or reverse direction according to the rotating direction of the cam gear 13.

Therefore, when the video cassette tape is inserted into the video recording and reproducing system and the recording mode or reproducing mode is selected, the tape loading unit drags the magnetic video tape out of the cassette, and makes it tightly contact a drum, (not shown), and the capstan shaft 15. At the same time, the capstan motor 16 starts to actuate in order to rotate the capstan shaft 15, and the driving gear 3 of the rotating member 5 begins to rotate clockwise by the driving force of a motor, not shown, which is transmitted through a gear train.

When the rotating member 5 begins to rotate in accordance with the rotation of driving gear 3, the holder 6 moves upward and downward along the oblique guide groove 4 engraved on the outer surface of said rotating member 5 because the first protrusion formed on the lower end of holder 6 is guided by oblique guide groove 4. Therefore, since the pinch roller 11 is attached to holder 6 through the arm 9, pinch roller 11 and said arm 9 move upward and downward together with holder 6.

On the other hand, as shown in FIG. 3B when holder 6 moves downward to gather with arm 9 and pinch roller 11, the second protrusion 14 begins to be inserted into the cam groove 12 formed on the cam gear 13. Because cam gear 13 is engaged with the driving gear 3 being rotated clockwise, it begins to rotate counterclockwise, causing holder 6 is rotated clockwise. Since the cylindrical coil spring 10 is interposed between a spring hooking portion 6b formed the upper end of the holder 6 and a spring hooking portion 9b formed on the arm 9, arm 9 is pivoted clockwise on the shaft 2. Thus, the pinch roller 11, which is inserted rotatably to the pinch roller shaft 9a of arm 9 is urged elastically toward the capstan shaft 15 and is contacted tightly to that shaft 15. In this state, the tape is transferred between pinch roller 11 and capstan shaft 15. And when the cam gear 11 continues to rotate counterclockwise under the above described state, the holder 6 is rotated clockwise. However, the pivoting of the arm 9 is blocked because the pinch roller 11 is contacted to the capstan shaft 15. When the pivoting of the arm 9 is blocked, the cylindrical coil spring 10 is expanded, and the elastic force of that spring 10 for pivoting arm 9 on the shaft 2 acts as the pushing force for making the pinch roller 11 contact tightly to the capstan shaft 15. Therefore, the video tape is transferred by the direct rotating force of the capstan shaft 15 and the auxiliary rotating force of the pinch roller 11, and then the video recording or reproducing is carried out according to the selected mode.

As the first protrusion 7 of the holder 6 is inserted into the horizontal guide groove 4a after passing the oblique guide groove 4 engraved on the surface of the rotating member 5, the holder 6 can be rotated by the rotation of the cam gear 13.

However, in the conventional pinch roller driving device, it is necessary to assemble the component parts one-by-one, for example, the arm, the holder, bush and so on, in order to make the pinch roller contact 11 tightly to the capstan shaft 15. Therefore, there are problems that the number of the component parts is increased and the assembly accuracy of the driving device is decreased. Accordingly, when the pinch roller 11 contacts the capstan shaft 15 and the video tape is transferred between roller 11 and shaft 15, it is difficult to precisely maintain the squareness which has an effect on the stable transfer of the video tape. Consequently, such a conventional driving device has a problem that the video tape may be damaged during video recording or reproducing, and noise may be introduced on the display monitor. Also, with such a device it is impossible to expect a high assembling workability.

SUMMARY OF THE INVENTION

It is, therefore, an object of the present invention to provide a new type pinch roller driving device in which the arm and the bushing are formed integrally with the holder in order to reduce the number of the component parts, and to precisely maintain the squareness that has an effect on the stable transfer of the video tape.

Another object of the present invention is to avoid the tape damage and the noise occurrence during video recording and reproducing by maintaining the squareness precisely.

Still another object of the present invention is to raise the assembly workability and to cut down production cost by reducing the number of the component parts. A further object of the present invention is to smoothly transfer the video tape without slip between the pinch roller and the capstan shaft by providing a pressing unit in order to make the pinch roller contact tightly to the capstan shaft in a horizontal moving unit for moving the pinch roller horizontally.

These objects are achieved according to the present invention by providing a pinch roller driving device which is arranged in the video recording and reproducing system, and which comprises: a shaft mounted fixedly on a deck base; a vertical moving member including a holder and an arm formed integrally with the holder, wherein the holder has first protrusion for vertical movement of a pinch roller and second protrusion for horizontal movement of the pinch roller, and the arm has a pinch roller shaft formed integrally with the arm on one end thereof for inserting into the pinch roller rotatably; a rotating member rotatably inserted to the shaft of the deck base for moving the vertical moving member vertically, wherein guide grooves being engaged with the first protrusion are engraved on the outer surface of the rotating member, and a driving gear is formed integrally with the lower end of the rotating member; and a horizontal moving member for moving the vertical moving member toward a capstan shaft of a capstan motor, wherein the guide groove being engaged with the second protrusion is formed on the horizontal moving member, and an elastic member is arranged in the vicinity of the guide groove.

The foregoing objects are also achieved according to the present invention by providing a pinch roller driving device which is arranged in the video recording and reproduction system, and which comprises: a shaft mounted fixedly on a deck base; a moving member including a holder and an arm formed integrally with the holder, wherein the holder has a protrusion for horizontal movement of a pinch roller, and the arm has a pinch roller shaft formed integrally with the arm on one end thereof for inserting into the pinch roller rotatably; and a horizontal moving member for moving the moving member toward a capstan shaft of a capstan motor, wherein guide groove being engaged with the protrusion is formed on the horizontal moving member, and an elastic member is arranged in the vicinity of the guide groove.

Further objects and advantages of the present invention will become apparent from the following detailed description considered in connection with the accompanying drawings.

DESCRIPTION OF THE PREFERRED EMBODIMENT

The present invention will now be described in detail for an embodiment with the appended drawings.

Figure 4:
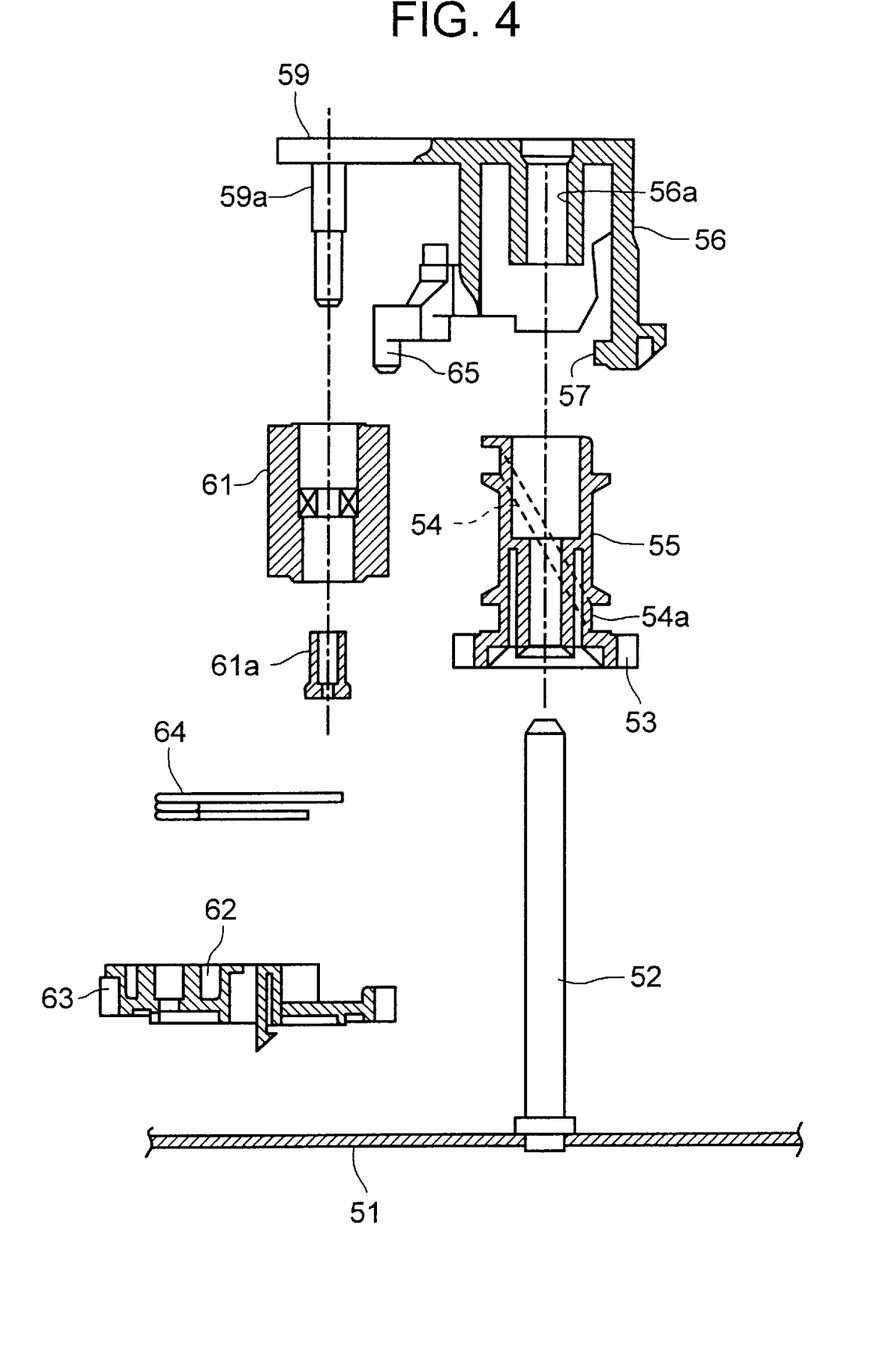
FIG. 4 is an exploded longitudinal sectional view showing a pinch roller driving device according to the present invention.
Figure 5A:
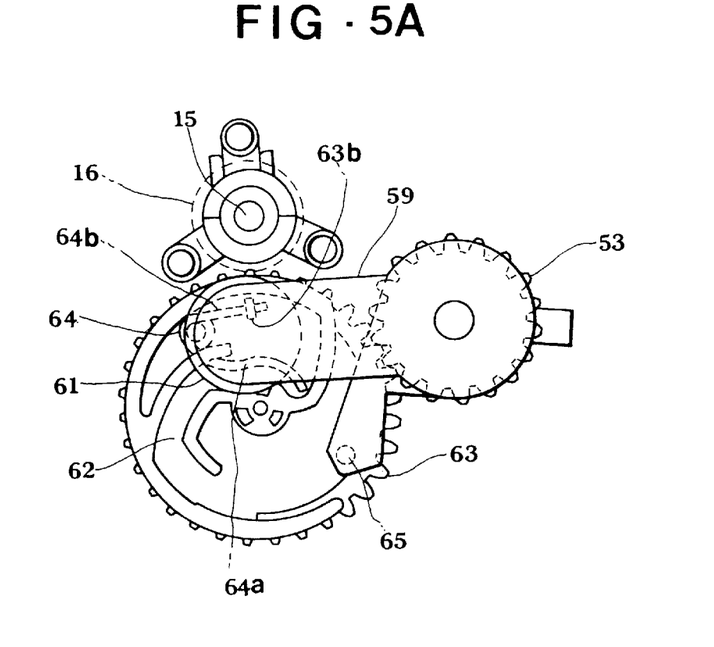
FIG. 5A is a schematic top plan view showing the state before the pinch roller is contacted to the capstan shaft in the embodiment of the present invention.
Figure 5B:
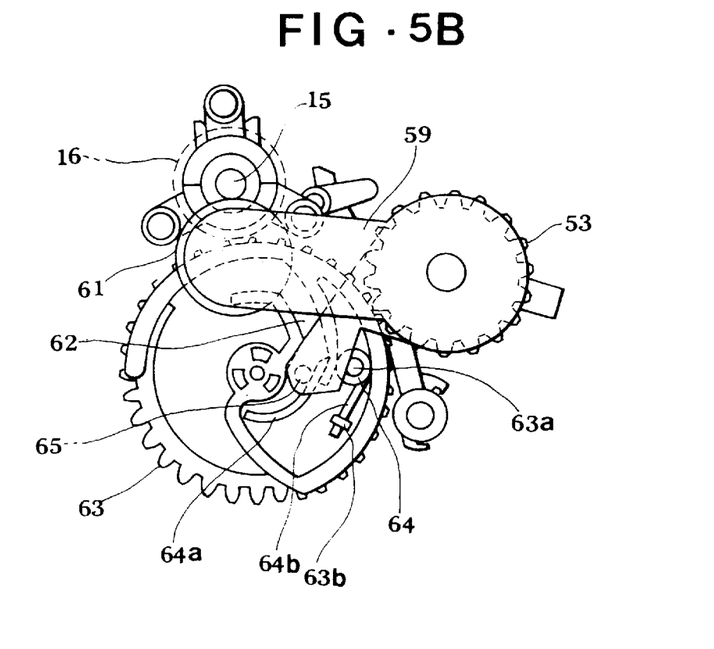
FIG. 5B is a schematic to plan view showing the state after the pinch roller is contacted to the capstan shaft in the embodiment of the present invention.
Figure 6A:
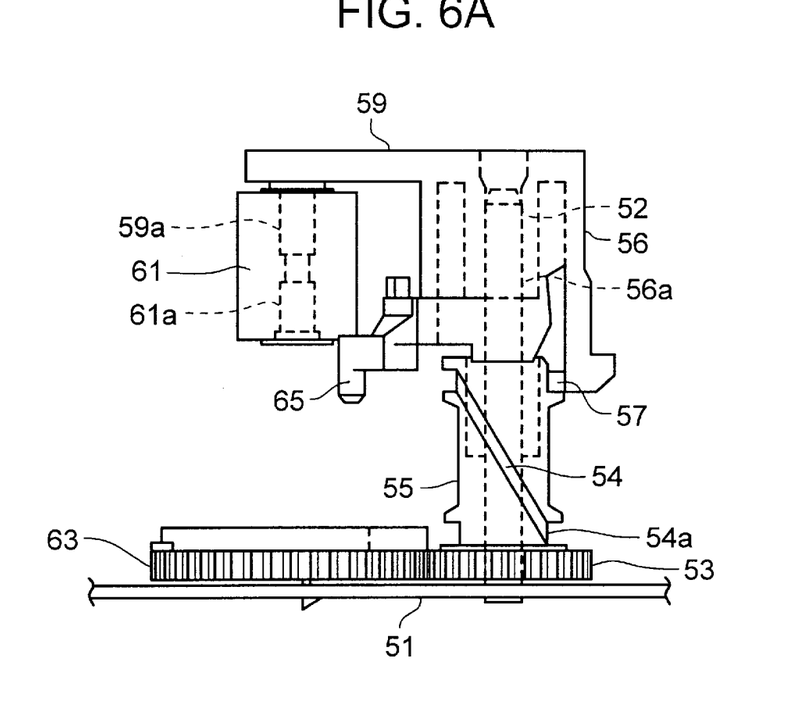
FIG. 6A is a schematic front view showing the state when the vertical moving member is moved upwards in the embodiment of the present invention.
Figure 6B:
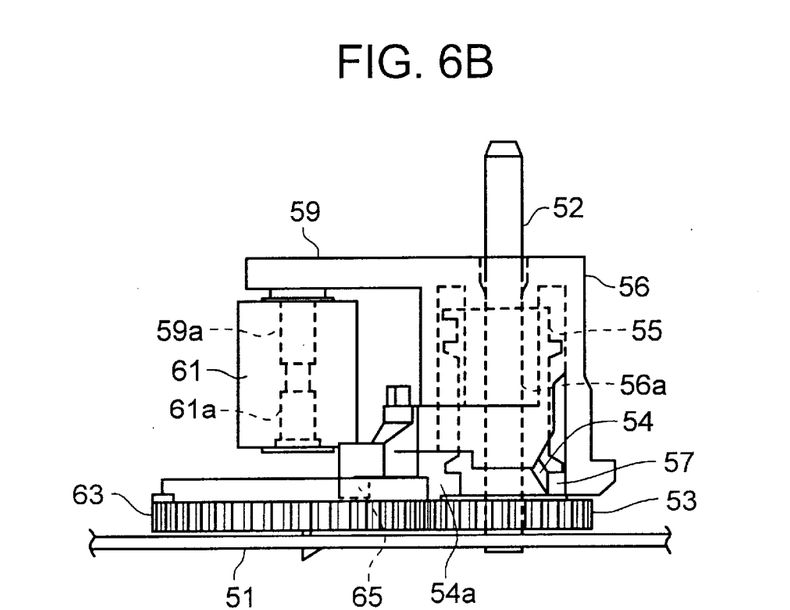
FIG. 6B is a schematic front view showing the state when the vertical moving member is moved downwards in the embodiment of the present invention.

FIG. 4 is an exploded longitudinal sectional view showing the pinch roller driving device of the embodiment, FIG. 5A and FIG. 5B are schematic top plan views thereof and FIG. 6A and 6B are schematic front views thereof. In the present invention, a shaft 52 is mounted fixed on a deck base 51. A rotating member 55 is inserted to the shaft 52. The rotating member includes a driving gear 53, which is formed integrally with the lower end of said rotating member 55. On the outer surface of the rotating member 55, an oblique guide groove 54 and a horizontal guide groove 54a are engraved continuously in order to guide a vertical moving member. The vertical moving member includes a holder 56 and an arm 59 formed integrally with the holder 56, wherein the holder 56 has first protrusion 57 and second protrusion 65 for causing vertical and horizontal of a pinch roller 61, respectively. Arm 59 has a pinch roller shaft 59a formed integrally arm 59 on one end thereof for inserting into pinch roller 61 rotatably. To the rotation axis of said holder 6 is formed a cylindrical shape portion having a guide surface 56a which is inserted to shaft 52 and for guiding the vertical movement of holder 56. The arm 59, the holder 56 and so on, are made of aluminum or plastics.

When said vertical moving member is inserted into rotating member 55, the cylindrical shape portion of holder 56 is inserted from the above. First protrusion 57 is projected radially inwardly for engagement with oblique guide groove 54 of the rotating member 55 to cause vertical moving member to move vertically based on to the rotating direction of rotating member 55. The pinch roller 61 is inserted rotatably into pinch roller shaft 59a formed integrally with the arm 59, and a cap 61a is inserted to the front end of shaft 59a, so that the separation of pinch roller 61 can be prevented.

On the deck base 51, there is provided a horizontal moving member, for example a cam gear 63, driven by the driving force of the driving gear 53. The holder 56 has second protrusion 65 which is projected downward from the lower end of holder 56 for engagement with a cam groove 62 formed on cam gear 63. When the vertical moving member is moved downward, as shown in FIG. 6B, the second protrusion 65 of holder 56 is guided by cam groove 62, so that the vertical moving member is rotated in a forward or reverse direction according to the rotating direction of cam gear 63. As shown in FIGS. 5A and 5B, an elastic member, for example, a torsional coil spring 64, is arranged in the vicinity of cam groove 62. The central portion of the torsional coil spring 64 is inserted to a protrusion 63a projected upward from the bottom of cam gear 63, and one end of spring 64 is mounted in the neighborhood of the boss of cam gear 63. The other end of spring 64 is fixed at the fixing portion 63*b*. The end of spring 64 that is mounted in the neighborhood of the boss of cam gear 63 has a curved shape portion. This curved shape portion is placed between an ending portion of cam groove 62 and the neighborhood of boss. The curved shape portion crosses the moving path of second protrusion 65 obliquely so as to urge the pinch roller 61 toward the capstan shaft.

Therefore, when the video cassette tape is inserted into the video recording and reproducing system and the recording mode or reproducing mode is selected, the tape leading unit drags the magnetic video tape out of the cassette, and makes it contact tightly to a drum (not shown), and the capstan shaft 15. At the same time, the capstan motor 16 starts to actuate in order to rotate the capstan shaft 15, and the driving gear 53 of the rotating member 5 begins to rotate clockwise by the driving force of a motor (not shown), which is transmitted through a gear train.

When the rotating member 55 begins to rotate based on the rotation of driving gear 53, the vertical moving member moves upward and downward along the oblique guide groove 54 engraved on the outer surface of rotating member 55 because the first protrusion 57 formed on the lower end of the vertical moving member is guided by oblique guide groove 54. Since the pinch roller 61 is attached to the vertical moving member, it moves upward and downward together with vertical moving member.

On the other hand, when the vertical moving member moves downwards, the second protrusion 65 that is projected downward from the lower end of the holder 56 begins to be inserted into the cam groove 62 formed on the cam gear 63. Once cam gear 63 is engaged with the driving gear 53 being rotated clockwise, it begins to rotate counterclockwise. Thus, before the second protrusion 65 passes through the cam groove 62 completely, the second protrusion 65 abuts the curved shape portion 64*a* of the torsional coil spring 64.

Accordingly, when the second protrusion 65 contacts curved shape portion 64*a* of spring 64 completely by continuous rotation of said cam gear 63, protrusion 65 receives the elastic force of spring 64, causing the vertical moving member to continue to rotate clockwise based on the elastic force. Simultaneously, the arm 59 rotates clockwise because it is formed integrally with said second protrusion 65. Thus, the pinch roller 61, which is inserted rotatably to the pinch roller shaft 59, is urged elastically toward and contacts tightly the capstan shaft 15 being rotated.

In this state, the video tape is transferred between pinch roller 61 and capstan shaft 15. When the cam gear 63 continues to rotate counterclockwise under the above described state, the vertical moving member is rotated clockwise. However, the pivoting of the vertical moving member is blocked because the pinch roller 61 contacts to the capstan shaft 15. When the pivoting of the vertical moving member is blocked, the elastic force of the torsional coil spring 64 for pivoting the vertical moving member on the shaft 52 acts as the pushing force for making the pinch roller 61 contact to the capstan shaft 15 tightly. Therefore, the video tape is smoothly transferred by the direct rotating force of the capstan shaft 15 and the auxiliary rotating force of the pinch roller 61 without slip between capstan shaft 15 and pinch roller 61, so that the video recording or reproducing can be carried out according to the selected mode.

Although the pinch roller driving device including the vertical moving member, the rotating member and the horizontal moving member is described in the foregoing embodiment, the rotating member 55 for moving the vertical moving member upward and downward can be omitted. Also, in the above described embodiment, the driving force of the motor is transmitted to the horizontal moving member through the rotating member 55, however the driving force transmitting structure can be modified reversely.

According to the present invention, it is possible to reduce the number of the component parts by forming the component parts integrally, and to precisely maintain the squareness that has an effect on the stable transfer of the video tape. Thus, tape damage and noise appearing on the display monitor during video recording or reproducing can be avoided.

Furthermore, it is possible to raise the assembling workability and to cut down production cost by reducing the number of the component part.

It is also possible to smoothly transfer the video tape without slip between the pinch roller and the capstan shaft by providing an elastic member into the horizontal moving member.

What is claimed is:

1. A pinch roller driving device for driving a video recording and reproducing system having a pinch roller, said device comprising:
   a shaft mounted and fixed on a deck base;
   a vertical moving member including:
      a holder with an arm formed integrally therewith, a pinch roller shaft being formed integrally with said arm and positioned on one end of said arm for rotatable engaging said pinch roller,
      a first protrusion for controlling vertical movement of said pinch roller, and
      a second protrusion for controlling horizontal movement of said pinch roller;
   a rotating member rotatably engaging said shaft of said deck base, said rotating member enabling movement of said vertical moving member upward and downward, guide grooves being engraved on an outer surface of said rotating member for engaging said first protrusion, a driving gear being formed integrally with one end of said rotating member; and
   a horizontal moving member for moving said vertical moving member toward a capstan shaft of a capstan motor, said horizontal moving member including a guide groove formed on said horizontal moving member for engaging said second protrusion, and an elastic member connected at a peripheral region of the horizontal moving member for pressing said pinch roller against said capstan shaft.

2. The pinch roller driving device according to claim 1, wherein said elastic member is a torsional coil spring, a central portion of said spring being coupled with a protrusion that projects upward from a surface of said horizontal moving member, one end of said spring being mounted at the peripheral region of said horizontal moving member.

3. The pinch roller driving device according to claim 2, wherein said one end of said elastic member has a curved shape portion, and said curved shape portion applies elastic force to said second protrusion, where said vertical moving member is moved to said capstan shaft when said curved shape portion contacted to said second protrusion.

4. A pinch roller driving device according to claim 2, wherein said one end of said spring guided said second protrusion of said vertical moving member.

5. The pinch roller driving device according to claim 1, wherein said one end of said elastic member has a curved shape portion, and said curved shape portion applies elastic force to said second protrusion, where said vertical moving member is moved to said capstan shaft when said curved shape portion contacts to said second protrusion.

6. The pinch roller driving device according to claim 5, wherein said curved shape portion is placed between an ending portion of said guide groove of said horizontal moving member and at the peripheral region of said horizontal moving member, and said curved shape portion crosses the moving path of said second protrusion obliquely.

7. The pinch roller driving device according to claim 5, wherein said curved shape portion is placed between an ending portion of said guide groove of said horizontal moving member and at the peripheral region of said horizontal moving member, and said curved shape portion crosses the moving path of said protrusion of said moving member.

8. The pinch roller driving device according to claim 1, wherein said holder includes a cylindrical shape portion formed around a rotational axis thereof, and said cylindrical shape portion has a guide portion which is coupled with said shaft of said deck base to guide the vertical movement of said holder.

9. The pinch roller driving device according to claim 1, wherein said horizontal moving member is a cam gear, and said guide groove of said horizontal moving member is a cam groove.

10. The pinch roller driving device according to claim 1, wherein the vertical moving member is a single integrated unit.

11. A pinch roller driving device for driving a video recording and reproducing system having a pinch roller, said device comprising:
   a shaft mounted and fixed on a deck base; a moving member including:
      a holder with an arm formed integrally therewith, a pinch roller shaft being positioned on one end of said arm for rotatable engaging said pinch roller, and
      a protrusion for controlling horizontal movement of the pinch roller; and
   a horizontal moving member for moving said moving member toward a capstan shaft of a capstan motor, the horizontal moving member including a guide groove formed thereon for engaging said protrusion, an elastic member being connected at a peripheral region of the horizontal moving member for pressing said pinch roller against said capstan shaft.

12. The pinch roller driving device according to claim 11, wherein said elastic member is a torsional coil spring, a central portion of said spring being coupled with a protrusion that projects upward from a surface of said horizontal moving member, one end of said spring being mounted at the peripheral region of said horizontal moving member.

13. The pinch roller driving device according to claim 12, wherein said one end of said elastic member has a curved shape portion, and said curved shape portion applies elastic force to said protrusion of said moving member, where said moving member is moved to said capstan shaft when said curved shape portion contacts to said protrusion of said moving member.

14. A pinch roller driving device according to claim 12, wherein said one end of said spring guided said second protrusion of said vertical moving member.

15. The pinch roller driving device according to claim 11, wherein said one end of said elastic member has a curved shape portion, and said curved shape portion applies elastic force to said protrusion of said moving member, where said moving member is moved to said capstan shaft when said curved shape portion contacts said protrusion of said moving member.

16. The pinch roller driving device according to claim 11, wherein said holder includes a cylindrical shape portion formed around a rotational axis thereof, and said cylindrical shape has a guide portion which is coupled with said shaft of said deck base to guide the horizontal movement of said holder.

17. The pinch roller driving device according to claim 1, wherein said horizontally moving member is a cam gear, and said guide groove of said horizontal moving member is a cam groove.

18. The pinch roller driving device according to claim 11, wherein the moving member is a single integrated unit.

19. A pinch roller driving device for driving a video recording and reproducing system having a pinch roller, said device comprising:
   a shaft mounted and fixed on a deck base;
   a holder with an arm formed integrally therewith, a pinch roller shaft being positioned on one end of said arm for rotatably engaging said pinch roller;
   a rotating member rotatably engaging said shaft of said deck base, said rotating member enabling movement of said holder upward and downward, and a driving gear being formed integrally with one end portion of said rotating member; and
   a horizontal moving member for moving said holder toward a capstan shaft of a capstan motor, and an elastic member connected at a peripheral region of said horizontal moving member and to selectively guide said holder toward a capstan of a capstan motor whereby said pinch roller comes into contact with said capstan shaft.

20. A pinch roller driving device according to claim 19, wherein said horizontal moving member is a cam gear having a cam groove being engaged with said holder.

21. The pinch roller driving device according to claim 20, wherein one end of said elastic member has a curved shape portion that applies elastic force to said holder to cause said pinch roller to be moved to said capstan shaft when said curved shape portion contacts said holder.

22. The pinch roller driving device according to claim 19, wherein said holder includes a cylindrical shape portion formed around a rotational axis thereof, and said cylindrical shape portion has a guide portion which is coupled with said shaft of said deck base to guide the vertical movement of said holder.

* * * * *